United States Patent
Kevorkian et al.

[11] Patent Number: 5,708,750
[45] Date of Patent: Jan. 13, 1998

[54] MANUFACTURE OF A BURIED WAVE GUIDE AT SEVERAL BURYING DEPTHS

[75] Inventors: Antoine Kevorkian; Dominique Persegol, both of Grenoble, France

[73] Assignee: Schneider Electric S.A., France

[21] Appl. No.: 640,744

[22] PCT Filed: Oct. 31, 1994

[86] PCT No.: PCT/FR94/01263

§ 371 Date: May 6, 1996

§ 102(e) Date: May 6, 1996

[87] PCT Pub. No.: WO95/13553

PCT Pub. Date: May 18, 1995

[30] Foreign Application Priority Data

Nov. 12, 1993 [FR] France ................. 93 13698

[51] Int. Cl.[6] ........................... G02B 6/12
[52] U.S. Cl. ................. 385/129; 385/130; 385/131; 385/14; 372/45
[58] Field of Search ............ 385/129–132, 385/14; 372/43, 44, 45; 437/129, 130, 131, 133

[56] References Cited

U.S. PATENT DOCUMENTS 4,711,514 12/1987 Tangonan et al. .............. 350/96.12
5,237,639 8/1993 Kato et al. .................... 385/14 X

FOREIGN PATENT DOCUMENTS 0380138 8/1990 European Pat. Off. .
2245374 3/1973 Germany .

OTHER PUBLICATIONS

Electronics Letters, vol. 28, No. 14, Jul. 2, 1992, "Novel Vertical Directional Coupler Made by Field–Assisted Ion–Exchanged Slab Waveguides In Glass", pp. 1340–1342.

Patent Abstracts of Japan, vol. 7, No. 198 (P–220).

*Primary Examiner*—Phan T. H. Palmer
*Attorney, Agent, or Firm*—Parkhurst, Wendel & Burr, L.L.P.

[57] ABSTRACT

Method of locally embedding a waveguide in a substrate. A mask is arranged on the upper face of the substrate. An edge of the mask obliquely intersects, at a low predetermined angle A, the waveguide to define a partially masked transition portion between non-masked portion and a fully masked portion of the waveguide. After a stage in which the waveguide is embedded in the substrate, the mask is withdrawn. The portion of the waveguide is thereby embedded at a depth greater than portion, portion forming a gradual adiabatic transition between both portions. The method is useful in the manufacture of sensors.

16 Claims, 3 Drawing Sheets

MANUFACTURE OF A BURIED WAVE GUIDE AT SEVERAL BURYING DEPTHS

The invention relates to a manufacturing process for an integrated optic device comprising a glass substrate and at least one optic wave guide, said wave guide having at least one first portion arranged in the substrate at a first depth with respect to a face of the substrate, at least one second portion arranged in the substrate at a second depth, greater than the first, with respect to said face and a transition portion between the first and second portions.

BACKGROUND OF THE INVENTION

Integrated optics techniques enable the form of a wave guide to be easily varied in one dimension, i.e. in a horizontal plane, that is to say in a plane parallel to a face of the substrate. For certain applications, it is desirable to form wave guides whose form also varies in depth.

Currently, two types of techniques enable wave guides of variable depth to be formed. According to a first technique, a predetermined part of the surface of the substrate is etched, by physical or chemical methods, to make the wave guide flush. With this first technique the surface of the substrate obtained after treatment is not flat, such that subsequent manufacturing stages are detrimentally effected. Moreover, it is difficult to control precisely the ablation depth of the substrate, which limits the manufacturing reproducibility. Losses or reflections occur at the transition zones which are not gradual and may present thermal withstand problems.

According to a second technique, a non-homogeneous electrical field is applied between a first face, or front face, of the substrate and an electrode arranged on a part of a second face, or rear face, of the substrate, opposite the first face. Applying an electrical field results in the wave guide being buried under the partial electrode and a transition zone of variable depth being formed in the rest of the substrate. The form of the transition zone is linked to the form of the field lines. This technique is only usable in a technology using mobile ions. In addition, the transition zone is always long, about several times the thickness of the substrate. As an example, for a substrate 3 mm thick, the transition zone is about 10 mm or more. Furthermore, alignment of the electrode situated on the rear face with respect to the guide situated on the front face requires a complex adaptation of existing machines.

SUMMARY OF THE INVENTION

The object of the invention is to achieve a process which does not present these various shortcomings. This object is achieved by the fact that the process according to the invention comprises placing a mask on said face of the substrate, said mask comprising at least one edge cutting the wave guide obliquely at a predetermined, preferably very small, angle so as to define at least one totally masked axial portion of the wave guide designed to form the first portion, an unmasked axial portion of the wave guide designed to form the second portion and a partially masked axial portion of the wave guide to form said transition portion, the process comprising a burying stage of the wave guide in the substrate, in the presence of said mask, to place the second portion of the wave guide at said second depth and form the transition portion, followed by a removal, stage of the mask.

The process according to the invention is notably perfectly suited to mass production, has excellent compatibility with other manufacturing stages of several integrated optics technologies and enables optimum control of the dimensions of the transition zone.

According to a first development, the process comprises a prior formation stage of an initial guide before said mask is placed on the face of the substrate. The prior formation stage of the initial guide and the wave guide burying stage are then performed, for example, by ion exchange technology, the mask being made of a material not permeable to ions, and the burying stage being performed by application of an electrical field.

According to a second development, formation of the wave guide is performed in a single stage, in the presence of the mask, according to an ion or electron implantation technology, said mask being made of a material that slows the ions or electrons.

The invention also relates to a device manufactured according to the claimed process.

According to a particular embodiment, the wave guide comprises two second portions arranged at said second depth and two transition portions joining the first portion, located at the surface, to each of said second portions, so as to form a sensor comprising an interaction zone with an external medium constituted by said first portion of the wave guide.

BRIEF DESCRIPTION OF THE DRAWINGS

Other advantages and features will become more clearly apparent from the following description of illustrative embodiments of the invention, given as non-restrictive examples only and represented in the accompanying drawings in which.

DETAILED DESCRIPTION OF THE INVENTION

Figure 1:
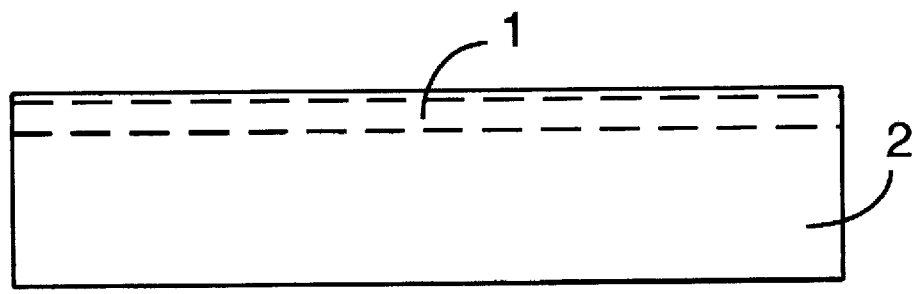
FIGS. 1 to 3 represent three successive stages of a process by ablation according to the prior art.
Figure 2:
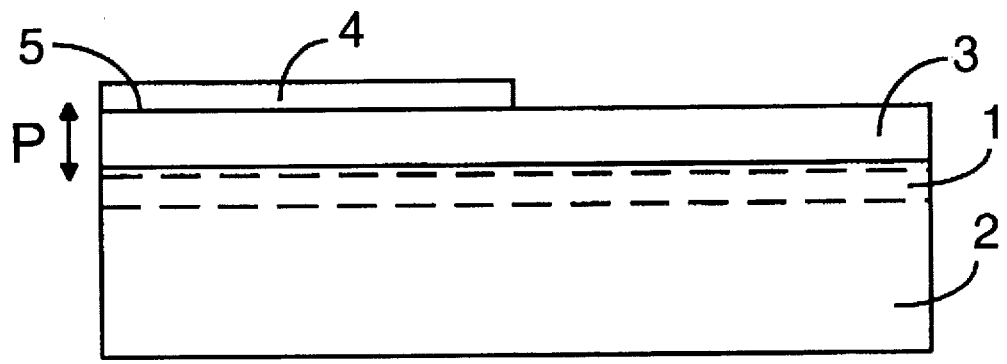
Figure 3:
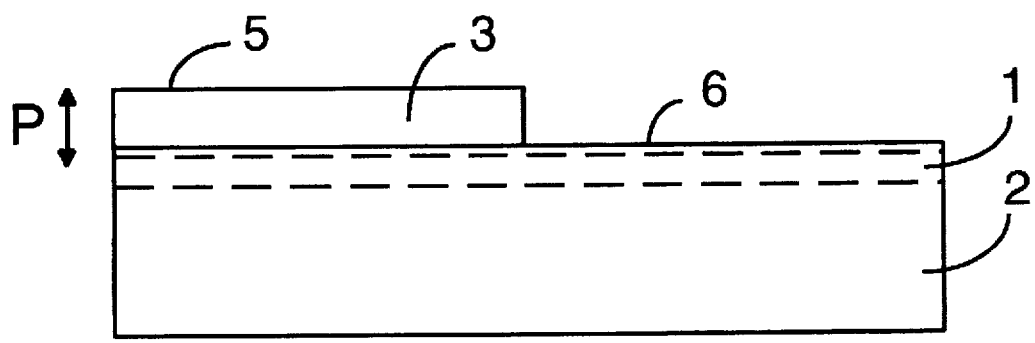

FIGS. 1 to 3 illustrate a process using a technique by ablation according to the prior art. In a first stage (FIG. 1) a wave guide 1 is formed at the surface in a glass substrate 2. In a second stage an additional layer 3 of substrate is deposited, in uniform manner, on the substrate 2. The wave guide 1 is thus buried at a depth P, appreciably equal to the thickness of the additional layer 3, with respect to the upper face 5 of the substrate 2, 3. In a third stage (FIG. 2), a mask 4 is deposited on a part of the upper face of the additional layer 3 so as to define a limit between a portion of the wave guide to be buried and a portion not to be buried. The additional layer 3 is then etched, by chemical or physical means, in its unmasked part. The mask is then removed by any suitable means and the device obtained is represented in FIG. 3. The wave guide 1 comprises a portion buried at a depth P under the remaining part of the additional layer and a portion at the surface in the substrate 2 in the unmasked zone where the additional layer was eliminated.

This manufacturing process is relatively long and complex. Some of the drawbacks already mentioned above are clearly apparent from the figures. The device obtained notably comprises an upper surface 5, 6 which is not flat, which can result in subsequent manufacturing being difficult. As an example, if the portion of wave guide located at the surface is disposed between two additional layers to act as a sensor, it may be difficult to deposit a thin layer of a material to be studied on the corresponding surface 6. Furthermore, it is difficult to control precisely the ablation depth of the additional layer very precisely, which limits the manufacturing reproducibility.

Figure 4:
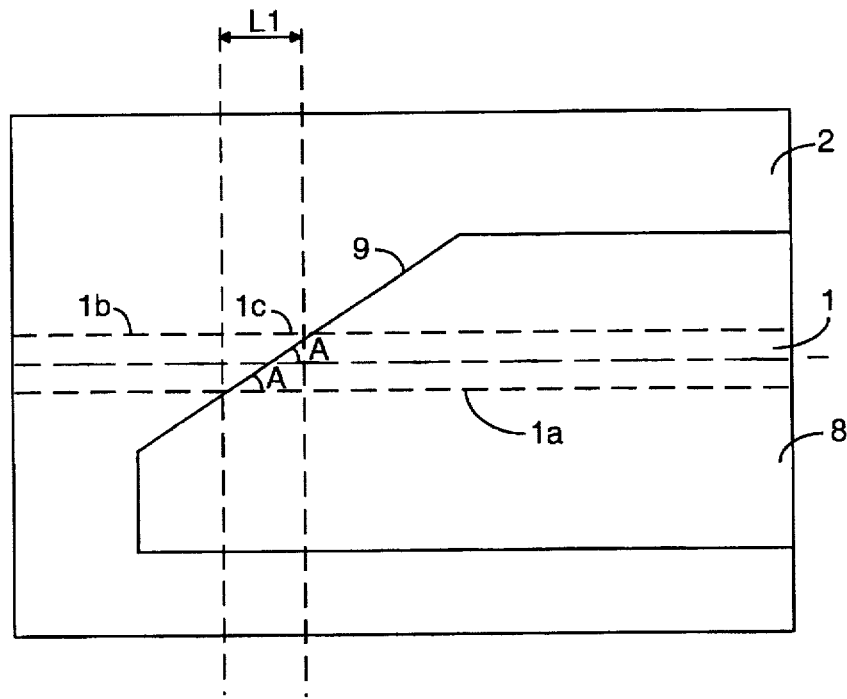
FIGS. 4 and 5 represent the arrangement of a mask on a face of a substrate comprising a wave guide, according to the present invention, respectively in bottom view and front view.
Figure 5:
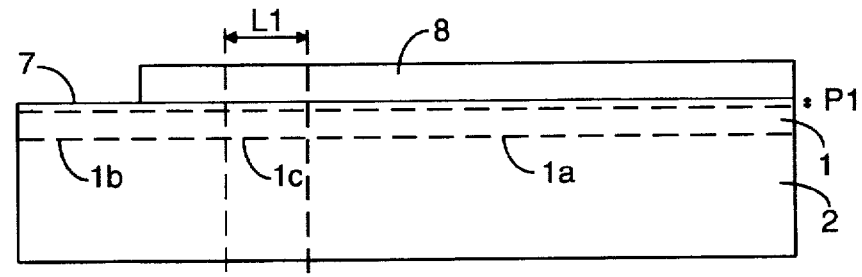

In the particular embodiment represented in FIGS. 4 and 5, a wave guide 1 has been previously formed in a substrate 2, at the surface, or at a small depth P1 with respect to the upper face 7 of the substrate. In FIG. 4, the wave guide 1 is a guide of uniform width. The invention is applicable whatever the shape of the wave guide in a horizontal plane, parallel to the face 7. Likewise, several distinct wave guides can be formed simultaneously in a single substrate.

A mask 8 is deposited on upper face 7 of the substrate 2. The mask 8 completely covers a masked portion 1a of the guide and it leaves a completely unmasked portion 1b. It comprises, in addition, an edge 9 cutting the wave guide obliquely, at a predetermined angle A, so as to leave a partially masked axial portion 1c of the wave guide. The angle A, exaggerated in the figure for the sake of clarity, is very small, preferably about a few degrees. The axial length L1 of the partially masked portion 1c can be defined very precisely. In particular, axial length L1"; and it depends on the width of the wave guide 1 in this portion of guide and on the angle A.

As a non-restrictive example, for a single-mode wave guide, 5 to 10 micrometers in width in the partially masked portion, the angle A is smaller than about 5° and preferably about one degree. It is thus possible to define with precision a partially masked portion 1c about 0.5 mm to 1 mm long.

Figure 6:
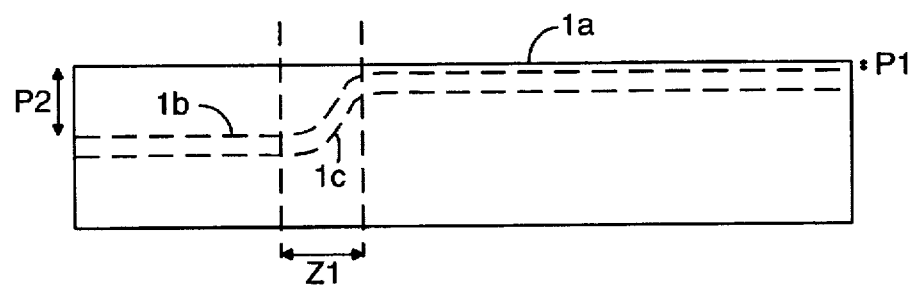
FIG. 6 illustrates, in front view, the device obtained after the mask of FIGS. 4 and 5 has been removed.

The process then comprises a local burying stage of the wave guide in the substrate in the presence of the mask. The unmasked portion 1b is buried at a predetermined depth P2, whereas the masked portion 1a remains appreciably at its initial depth P1. The partially masked portion 1c then automatically constitutes a transition portion, of variable depth, between the portions 1a and 1b. The transition is a gradual transition, of adiabatic type, so that the insertion gradients are very small. Insertion losses lower than 10% are for example easily achieved. The axial length L1 of the transition zone of the guide corresponds to the axial length Z1 of the partially masked portion 1c, defined precisely when the mask is placed on the substrate. This length is sufficiently great, more than 10 micrometers, and typically about 0.5 mm, to limit the insertion losses. The mask 8 is then removed by any suitable process and the device obtained is represented in FIG. 6.

The process described above can be achieved by ion exchange technology, using ion migration under an electrical field. The previous formation stage of the guide 1 in the substrate can be performed in the same technology by a first ion exchange, which may be assisted by an electrical field. If the mask 8 is made of a material not permeable to ions, for example aluminium or a dielectric material, the initial guide can be locally buried by application of an electrical field. The mask 8 is then removed, for example by chemical dissolution, for the device to again present a flat and uniform upper surface (FIG. 6).

The process can also be performed by means of ion or electron implantation technology. The mask 8 is then formed by a material that slows the incident ions or electrons, for example a metal compatible with the material forming the substrate 2, so as to form a filter. The wave guide 1 can then be formed in a single stage, the ions or electrons penetrating more deeply into the substrate in the unmasked zone than in the masked zone. The partially masked zone forms as previously the transition zone. The mask is then removed by any suitable process.

Figure 7:
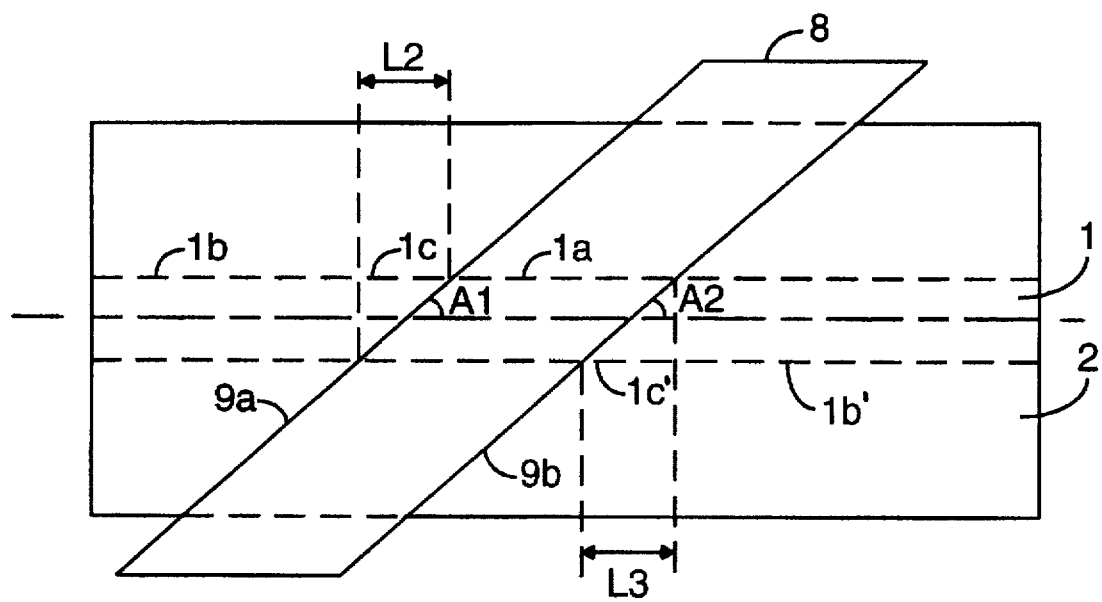
FIG. 7 illustrates, in bottom view, the arrangement of a mask to form a sensor according to a particular embodiment.
Figure 8:
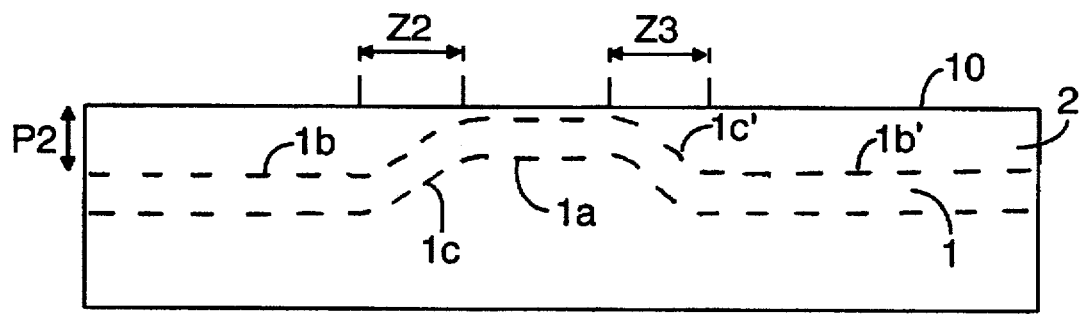
FIG. 8 represents, in front view, the sensor obtained after the mask according to FIG. 7 has been removed.

FIGS. 7 and 8 illustrate the use of the process according to the invention for manufacturing a sensor comprising a wave guide 1 having a zone 1a flush with the surface 10 of a substrate 2 so as to create an interaction zone of the wave guide with an external medium. At the two ends of the sensor, the wave guide comprises two portions 1b and 1b', buried in the substrate. Burying the guide enables, notably due to its circular symmetry, easier coupling with other optic elements, for example with optic fibres. It also enables light to be conducted with minimum losses.

To form the sensor according to FIG. 8, a mask 8 as represented in FIG. 7 is used. The mask 8 comprises a first edge 9a, forming an angle A1 with the axis of the wave guide to define a first transition zone Z2. It defines as before an unmasked portion 1b, a partially masked portion 1c, of length L2 and a first end of a masked portion 1a. A second edge 9b of the mask, forming an angle A2 with the axis of the wave guide, defines a second transition zone Z3, separated from the first transition zone Z2 by the masked portion 1a. The second edge 9b bounds the second end of the masked portion 1a, a second partially masked portion 1c' and a second unmasked portion 1b'. The angles A1 and A2 can be equal, as represented in the figure, or different.

It is thus possible to form simultaneously several non-buried and buried zones of a wave guide in a substrate, an edge of a mask defining a gradual transition zone, of variable depth, between a buried zone and an adjacent non-buried zone.

The configuration of the device represented in FIG. 8 can be used to achieve physical, chemical or biological sensors, the medium to be studied coming into contact with the portion 1a of the wave guide. It can also be used to achieve polarizers, a birefringent metal or medium then being placed on the interaction zone 1a. More generally, it is usable in any kind of device where an interaction is to be established between an external medium and the light conveyed in the guide. Non-linear effect devices and optic amplifiers can also use this type of configuration.

As a non-restrictive example, a device achieved according to the process according to the invention may comprise a glass substrate from 1 to 5 mm thick and several centimeters long. The mask is formed by deposition of a suitable material of about 0.2 micrometers. The unmasked portion 1b of the wave guide is buried about 10 micrometers from the upper surface 10 of the substrate and the length of the transition zone is about 0.5 mm. Such dimensions are easily reproducible.

The length of the transition zone can be easily predetermined from the width of the wave guide in the transition zone and from the angle between the mask and the wave guide. This process enables the insertion losses to be reduced by automatically forming an adiabatic transition zone between a buried zone and an adjacent non-buried, or less buried, zone.

The process is simple and inexpensive, and perfectly well-suited to mass production. It is moreover perfectly compatible with other manufacturing stages of a device according to several integrated optics technologies.

We claim:

1. A manufacturing process for an integrated optic device, comprising the steps of:

providing a glass substrate with at least one optic waveguide at a first depth with respect to a face of the substrate;

positioning a mask with at least one edge having a predetermined oblique angle with respect to an axial direction of said waveguide on said waveguide such that a first axial portion of said waveguide is fully covered, a second axial portion of said waveguide is fully uncovered and a third axial portion of said waveguide is partially covered;

subjecting the substrate to a waveguide burying process to (i) bury said second portion of said waveguide at a second depth deeper than said first depth and (ii) obtain a depth transition portion connecting said first and second axial portions of said waveguide; and removing said mask.

2. The process of 1, further comprising forming said at least one waveguide in said substrate prior to said mask positioning step.

3. The process of claim 2, wherein said forming of said at least one waveguide in said substrate and said waveguide burying process are accomplished by an ion exchange process including application to the substrate of an electrical field, and said mask comprises material not permeable to ions used in said ion exchange process.

4. The process of 3, wherein said mask comprises one of aluminum and a dielectric material.

5. The process of claim 2, wherein said mask is removed from said substrate by chemical dissolution.

6. The process of claim 3, wherein said mask is removed from said substrate by chemical dissolution.

7. An integrated optic device produced by the process of claim 1, comprising a glass substrate having at least one optic waveguide, said waveguide having at least one first portion arranged in said substrate at a first depth with respect to a face of said substrate, at least one second portion arranged in said substrate at a second depth, with respect to said face of said substrate, greater than said first depth, and a transition portion between said first and second portions.

8. The device of claim 7, wherein an axial dimension of said transition portion is about 0.5 to 1 mm.

9. The device of claim 7, wherein said waveguide comprises two second portions located at said second depth and two transition portions joining the first portion, located at a surface of said substrate, to each of said second portions, thereby forming a sensor having an external medium interaction zone constituted by said first portion of said waveguide.

10. The device of claim 8, wherein said waveguide comprises two second portions located at said second depth and two transition portions joining the first portion, located at a surface of said substrate, to each of said second portions, thereby forming a sensor having an external medium interaction zone constituted by said first portion of said waveguide.

11. The process of claim 1, wherein said predetermined angle is less than about 5 degrees.

12. The process of 11, further comprising forming said at least one waveguide in said substrate prior to said mask positioning step.

13. The process of claim 11, wherein said mask is removed from said substrate by chemical dissolution.

14. The process of claim 1, wherein said at least one optic waveguide at a first depth is coextensive with a first plane and said second portion of said waveguide at a second depth deeper than said first depth is coextensive with a second and distinct plane, said first and second planes being substantially parallel to each other and to said face of the substrate.

15. The process of claim 1, wherein said step of providing a glass substrate with at least one optic waveguide is accomplished simultaneously with said burying process, via an ion or electron implantation process, after said mask is positioned on said substrate and wherein said mask comprises material that slows the ions or electrons of said ion or electron implantation process.

16. The process of claim 1, wherein said mask is removed from said substrate by chemical dissolution.

* * * * *